(12) United States Patent
Bull

(10) Patent No.: US 11,378,824 B2
(45) Date of Patent: Jul. 5, 2022

(54) FLEXIBLE ENCAPSULATED ELECTRO-OPTIC MEDIA

(71) Applicant: E Ink Corporation, Billerica, MA (US)

(72) Inventor: Darwin Scott Bull, Harvard, MA (US)

(73) Assignee: E Ink Corporation, Billerica, MA (US)

( * ) Notice: Subject to any disclaimer, the term of this patent is extended or adjusted under 35 U.S.C. 154(b) by 524 days.

(21) Appl. No.: 16/524,661

(22) Filed: Jul. 29, 2019

(65) Prior Publication Data
US 2020/0050025 A1    Feb. 13, 2020

Related U.S. Application Data

(60) Provisional application No. 62/715,314, filed on Aug. 7, 2018.

(51) Int. Cl.
*G02F 1/00* (2006.01)
*G02F 1/1333* (2006.01)
(Continued)

(52) U.S. Cl.
CPC .............. *G02F 1/0018* (2013.01); *C08L 9/06* (2013.01); *C08L 53/02* (2013.01);
(Continued)

(58) Field of Classification Search
CPC ...... C08L 9/06; C08L 53/02; G02F 2202/022; G02F 1/0018; G02F 1/00; G02F 1/0009; G02F 1/133305; G02F 1/167
(Continued)

(56) References Cited

U.S. PATENT DOCUMENTS 5,262,232 A   11/1993  Wilfong et al.
5,331,062 A    7/1994  Sorathia et al.
(Continued)

FOREIGN PATENT DOCUMENTS

CN    105949384 A    9/2016
JP    2011227109 A   4/2010
(Continued)

OTHER PUBLICATIONS

Kitamura, T et al., "Electrical toner movement for electronic paper-like display", Asia Display/IDW '01, pp. 1517-1520, Paper HCS1-1 (2001). Jan. 1, 2001.
(Continued)

*Primary Examiner* — William R Alexander
(74) *Attorney, Agent, or Firm* — Brian D. Bean

(57) ABSTRACT

An electro-optic medium is disclosed including a continuous phase comprising a binder and a discontinuous phase comprising electro-optic material. The binder may include one or more elastomers having a Young's modulus less than 25 MPa. The electro-optic material may include capsules that encapsulate various kinds of materials capable of switching optical states, such as a plurality of charged particles dispersed in a suspending fluid and capable of moving upon application of an electric field to the suspending fluid. The electro-optic medium may be incorporated into a laminated flexible electro-optic display having an outer light-transmissive protective layer and conductive material on either side of the electro-optic medium. The conductive material on at least one side of the electro-optic medium may also be light-transmissive. The opposing side of the display relative to the outer protective layer may also include a substrate.

28 Claims, 2 Drawing Sheets

(51) Int. Cl.
*C08L 53/02* (2006.01)
*C08L 9/06* (2006.01)
*G02F 1/167* (2019.01)

(52) U.S. Cl.
CPC ........ *G02F 1/133305* (2013.01); *G02F 1/167* (2013.01); *G02F 2202/022* (2013.01)

(58) Field of Classification Search
USPC .......................................................... 359/296
See application file for complete search history.

(56) References Cited

U.S. PATENT DOCUMENTS

| | | | |
|---|---|---|---|
| 5,760,761 A | 6/1998 | Sheridon | |
| 5,777,782 A | 7/1998 | Sheridon | |
| 5,808,783 A | 9/1998 | Crowley | |
| 6,054,071 A | 4/2000 | Mikkelsen, Jr. | |
| 6,055,091 A | 4/2000 | Sheridon et al. | |
| 6,097,531 A | 8/2000 | Sheridon | |
| 6,128,124 A | 10/2000 | Silverman | |
| 6,137,467 A | 10/2000 | Sheridon et al. | |
| 6,147,791 A | 11/2000 | Sheridon | |
| 6,241,921 B1 | 6/2001 | Jacobson et al. | |
| 6,549,327 B2 | 4/2003 | Foucher et al. | |
| 6,825,068 B2 | 11/2004 | Denis et al. | |
| 6,831,769 B2 | 12/2004 | Holman et al. | |
| 6,866,760 B2 | 3/2005 | Paolini Jr. et al. | |
| 6,874,257 B2 | 4/2005 | Erickson et al. | |
| 6,922,276 B2 | 7/2005 | Zhang et al. | |
| 6,982,178 B2 | 1/2006 | LeCain et al. | |
| 7,002,728 B2 * | 2/2006 | Pullen | G09F 9/372 345/107 |
| 7,012,600 B2 | 3/2006 | Zehner et al. | |
| 7,072,095 B2 | 7/2006 | Liang et al. | |
| 7,075,502 B1 | 7/2006 | Drzaic et al. | |
| 7,110,164 B2 | 9/2006 | Paolini, Jr. et al. | |
| 7,116,318 B2 | 10/2006 | Amundson et al. | |
| 7,144,942 B2 | 12/2006 | Zang et al. | |
| 7,170,670 B2 | 1/2007 | Webber | |
| 7,173,752 B2 | 2/2007 | Doshi et al. | |
| 7,206,119 B2 | 4/2007 | Honeyman et al. | |
| 7,236,291 B2 | 6/2007 | Kaga et al. | |
| 7,312,784 B2 | 12/2007 | Baucom et al. | |
| 7,321,459 B2 | 1/2008 | Masuda et al. | |
| 7,339,715 B2 | 3/2008 | Webber et al. | |
| 7,411,719 B2 | 8/2008 | Paolini, Jr. et al. | |
| 7,453,445 B2 | 11/2008 | Amundson | |
| 7,477,444 B2 | 1/2009 | Cao et al. | |
| 7,521,292 B2 * | 4/2009 | Rogers | H01L 31/1804 438/455 |
| 7,535,624 B2 | 5/2009 | Amundson et al. | |
| 7,551,346 B2 | 6/2009 | Fazel et al. | |
| 7,561,324 B2 | 7/2009 | Duthaler et al. | |
| 7,679,814 B2 * | 3/2010 | Paolini, Jr. | E06B 9/24 345/107 |
| 7,715,088 B2 | 5/2010 | Liang et al. | |
| 7,839,564 B2 | 11/2010 | Whitesides et al. | |
| 7,843,625 B2 | 11/2010 | Yamamoto et al. | |
| 8,009,348 B2 | 8/2011 | Zehner et al. | |
| 8,238,020 B2 * | 8/2012 | Yamamoto | G02F 1/16757 204/600 |
| 8,552,299 B2 * | 10/2013 | Rogers | H01L 21/4867 174/254 |
| 9,279,906 B2 | 3/2016 | Kang | |
| 9,361,078 B2 | 6/2016 | Gao et al. | |
| 9,470,950 B2 | 10/2016 | Paolini, Jr. et al. | |
| 10,266,733 B2 | 4/2019 | Liu et al. | |
| 2003/0025855 A1 * | 2/2003 | Holman | G02F 1/1675 349/86 |
| 2007/0091417 A1 | 4/2007 | Cao et al. | |
| 2009/0059349 A1 * | 3/2009 | Yamamoto | G02F 1/16757 359/296 |
| 2009/0122389 A1 | 5/2009 | Whitesides et al. | |
| 2013/0242378 A1 * | 9/2013 | Paolini, Jr. | G02F 1/167 156/60 |
| 2015/0005720 A1 | 1/2015 | Zang | |
| 2015/0277160 A1 | 10/2015 | Laxton | |
| 2016/0012710 A1 | 1/2016 | Lu et al. | |
| 2020/0183248 A1 * | 6/2020 | Adams | G02F 1/16757 |

FOREIGN PATENT DOCUMENTS

| | | |
|---|---|---|
| JP | 2011170019 A | 9/2011 |
| JP | 2012145706 A | 8/2012 |

OTHER PUBLICATIONS

Yamaguchi, Y et al., "Toner display using insulative particles charged triboelectrically", Asia Display/IDW '01, pp. 1729-1730, Paper AMD4-4 (2001). Jan. 1, 2001.
Suhr, Jonghwan et al., "Energy dissipation in carbon nanotube composites: a review", Journal of Materials Science, vol. 43, Issue 13, pp. 4370-4382; (Jul. 1, 2008). Jul. 1, 2008.
Barbero, G et al., "Transport process of ions in insulating media in the hyperbolic diffusion regime", Physical Review E 81, 051503(2010). Feb. 9, 2010.
Choi, Myeon-Cheon et al., "Polymers for flexible displays: from material selection to device applications", Progress in Polymer Science, vol. 33, No. 6, pp. 581-630 (2008).
Korean Intellectual Property Office, PCT/US2019/043895, International Search Report and Written Opinion, dated Nov. 14, 2019.
European Patent Office, "Extended European Search Report", EP Appl. No. 19847546.9, dated Mar. 28, 2022.

* cited by examiner

FLEXIBLE ENCAPSULATED ELECTRO-OPTIC MEDIA

CROSS REFERENCE TO RELATED APPLICATIONS

This application claims the benefit of and priority to U.S. Provisional Application having Ser. No. 62/715,314, filed on Aug. 7, 2018, the content of which is incorporated by reference herein in its entirety.

BACKGROUND OF INVENTION

This invention relates to flexible displays. More specifically, in one aspect this invention relates to electro-optic displays containing encapsulated electro-optic media.

Electro-optic displays may be utilized in various applications that require light-weight materials and low power consumption. There is also growing demand for flexible or foldable electro-optic displays. While electro-optic displays may include flexible layers or substrates, such displays can be damaged under extreme stress, particularly displays that incorporate encapsulated electro-optic media. Such failure may occur by mechanical rupture of the capsule wall. Rupture results in the internal phase of the capsules migrating within the display. If a lamination adhesive layer is present adjacent to the electro-optic medium, there is a risk of the internal phase dissolving this adhesive layer and leaving behind as an optically inactive area of the display, which causes visual defects in any image thereafter written on the display.

Accordingly, there is a need to improve the mechanical robustness of encapsulated electro-optic media in flexible or foldable displays to reduce the occurrence of such visual defects.

SUMMARY OF THE INVENTION

In one aspect, an electro-optic medium may comprise a continuous phase comprising a binder and a discontinuous phase comprising electro-optic material, wherein the binder comprises an elastomer having a Young's modulus less than 25 MPa.

These and other aspects of the present invention will be apparent in view of the following description.

BRIEF DESCRIPTION OF THE FIGURES

The drawing Figures depict one or more implementations in accord with the present concepts, by way of example only, not by way of limitations. The drawings are not to scale. In the figures, like reference numerals refer to the same or similar elements.

DETAILED DESCRIPTION

Figure 1:
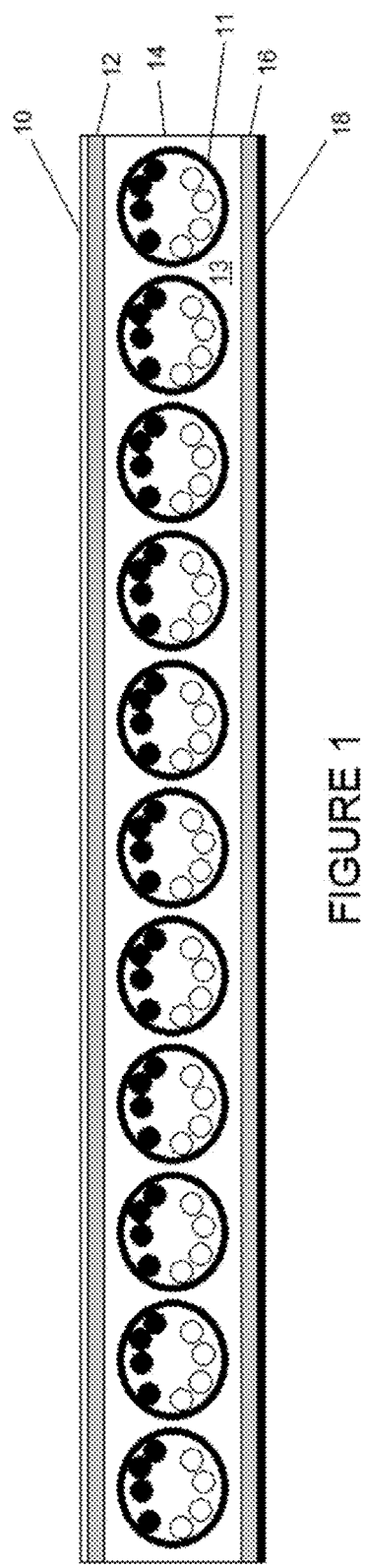
FIG. 1 is a cross-sectional side view of an electro-optic display according to a first embodiment of the present invention.

In the following detailed description, numerous specific details are set forth by way of examples in order to provide a thorough understanding of the relevant teachings. However, it should be apparent to those skilled in the art that the present teachings may be practiced without such details.

Generally, the various embodiments of the present invention comprise an electro-optic medium that may be incorporated into a flexible or foldable display. The electro-optic medium may comprise a plurality of capsules and a binder. The binder may include one or more elastomers having a Young's modulus less than 25 MPa. As used herein, throughout the specification and the claims, the term "elastomer" means a macromolecular material that returns rapidly to approximately its initial dimensions and shape after substantial deformation by a weak stress and release of the stress.

The capsules may encapsulate various kinds of materials capable of switching optical states, such as an electrophoretic fluid that comprises a plurality of charged particles dispersed in a suspending fluid and capable of moving upon application of an electric field to the suspending fluid. The electro-optic medium may be incorporated into a laminated flexible electro-optic display having an outer light-transmissive protective layer and conductive material on either side of the electro-optic medium. The conductive material on at least one side of the electro-optic medium may also be light-transmissive. The opposing side of the display relative to the outer protective layer may also include a substrate.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564;
(h) Methods for driving displays; see for example U.S. Pat. Nos. 7,012,600 and 7,453,445;
(i) Applications of displays; see for example U.S. Pat. Nos. 7,312,784 and 8,009,348; and
(j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Other types of electro-optic media may also be used in the displays of the present invention.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As already noted, an encapsulated electro-optic medium typically comprises capsules disposed in a polymeric binder, which serves to form the discrete capsules into a coherent layer. The continuous phase in a polymer-dispersed electrophoretic medium serves similar functions. The present invention seeks to provide improved binder compositions to reduce or eliminate the likelihood of rupture and leakage of the encapsulated electro-optic media that may result from the stress applied during bending a flexible display. The binder systems according to the various embodiments of the present invention preferably have sufficient strength to withstand the stresses encountered when bending to very small radii (i.e., <7 mm).

Current binder technology is not designed to dissipate the stresses encountered during extreme bending and as a result, the stresses are concentrated on the capsule walls. By using a highly viscoelastic polymer within the binder system, it is believed that the stress can be delocalized and reduce or eliminate the likelihood of rupture. It is an aspect of the invention that the binder system include an energy-dissipating elastomer. Such elastomers are typically phase-separated polymers, such as block-copolymers and thermoplastic polymers. The elastomers incorporated in the binder may have a Young's modulus less than about, with increasing preference in the order listed, 25 MPa, 20 MPa, 15 MPa, 10 MPa, 5 MPa, and 1 MPa. The elastomers incorporated in the various embodiments of the present invention may at a temperature between −10 and +40° C. have a Young's storage modulus E' between 0.1 MPa and 1000 MPa, a loss factor greater than 0.3, and a shear storage modulus G' between 0.1 MPa and 500 MPa in the frequency range 0 to 500 Hz. The elastomer may also have a glass transition temperature in a range from −125 to +20° C. The elastomers in the binder system are also preferably immiscible in the electro-optic material. Furthermore, with respect to electro-optic material encapsulated within capsules, the elastomers are preferably compatible with the capsule materials, i.e. the elastomers will not repel the capsule walls.

Examples of elastomers that may be included in the various embodiments of the present invention include, but are not limited to, synthetic and natural rubbers, polybutadiene, polyisoprene, styrene-butadiene-styrene block copolymers, styrene-isoprene-styrene, styrene-isoprene/butadiene-styrene block copolymers, styrene-ethylene/butylene-stryene block copolymers, styrene-ethylene/propylene block copolymers, styrene-ethylene/propylene-styrene block copolymers, isoprene-butadiene block copolymers, butadiene-isoprene-styrene block copolymers, styrene-isobutylene-styrene block copolymers, butyl rubber, ethylene-propylene-diene monomer rubber (such as ethylene propylene diene terpolymers, ethylene octene copolymers, ethylene butene copolymers, ethylene octene terpolymers, ethylene butene terpolymers, ethylene vinylacetate, and ethylene methylacrylate), polyurethane elastomers, epoxy-acrylate thermoset resins, polychloroprene rubber, acrylonitrile butadiene rubber, hydrogenated acrylonitrile butadiene rubber, alkylated chlorosulfonated polyethylene, epichlorohydrin, ethylene alpha olefin elastomers, silicone rubber, silicone block copolymers (such as poly(dimethylsiloxane)-co-polycarbonate), acrylic polymers, and combinations thereof.

It is a further aspect of the present invention to provide a mechanically robust electro-optic medium similar to a polymer dispersed electro-optic medium that may be incorporated into a flexible display, but utilizes a relatively lower weight ratio of binder to encapsulated media. This may provide a lighter display with improved optical properties, as compared to a display including polymer dispersed electro-optic medium because of the increased amount of encapsulated media present in the switchable layer. It is preferred that the various embodiments of the present invention have a weight ratio of binder to electro-optic material within the electro-optic medium that is at least, with increasing preference in the order given, 0.05, 0.10, 0.15, 0.20, 0.25, 0.30, 0.40, 0.45, 0.50, 0.55, and 0.60.

The binder systems according to the various embodiments of the present invention may further comprise one or more non-elastomeric polymers. Examples of non-elastomeric polymers that may be incorporated into the various embodiments of the present invention include, but are not limited to, polysaccharides, polyvinyl alcohols, poly(N-vinylpyrrolidone), polyethylene glycol, poly(2-hydroxyethyl acrylate), polymers of bisphenol A diglycidyl ether, latices of polyurethanes optionally compounded with one or more of acrylics, polyesters, polycarbonates, silicones, an epoxidized vegetable oil fatty acid, an epoxidized ester of a vegetable oil fatty acid, and combinations thereof. Additional non-elastomeric materials that may be incorporated in the various embodiments of the invention are disclosed in U.S. Pat. Nos. 6,831,769; 7,110,164; 7,173,752; 7,477,444; 7,551,346; and 9,470,950, as well as U.S. Patent Application Publication Nos. 2007/0091417 and 2009/0122389, the contents of which are incorporated by reference herein in their entireties. It is preferred that the binder systems comprising a blend of materials according to the various embodiments of the present invention include a weight ratio of elastomer to non-elastomeric polymer, with increasing preference in the order given, of at least 0.05, 0.10, 0.20, 0.25, 0.30, 0.35, 0.40, 0.45, and not more than, with increasing preference in the order given, 0.95, 0.90, 0.85, 0.80, 0.75, 0.70, 0.65, 0.60, 0.55, 0.50.

Some level of crosslinking of the binder system may be desired in certain applications to ensure that the layers maintain dimensional stability and resist creep during bending when incorporated into a laminated displays having various layers. As used herein, "creep" means that certain materials, such as the binder system or adhesive, within a flexible laminated display tend to undergo fluid flow when flexed with the result that the electro-optic medium and/or other layers move slightly relative to the backplane. This can cause serious problems if, for example, the display is a color display in which a color filter array is disposed on the opposed side of the electro-optic medium from the backplane, since in such a display the various color stripes or other units of the color filter array need to be aligned with the pixel electrodes or serious color distortion may occur in the displayed image. Consider for example a display in which two adjacent pixel electrodes are aligned with red and blue color filter elements. If the color filter array creeps relative to the backplane such that the pixel electrode originally aligned with the red element is now aligned with half the red element and half the blue element, it will readily be apparent that the colors of the displayed image will differ substantially from that intended.

Cross-linking of the binder systems according to the various embodiments of the present invention may be achieved by using cross-linkable elastomers (see for example, U.S. Pat. No. 5,262,232) or blending the elastomers with cross-linkable non-elastomeric polymers (see for example, U.S. Pat. No. 5,331,062). The degree of cross-linking may therefore be varied within the binder system to provide both energy-dissipating properties and creep resistance for a given application. Crosslinking may be physical and/or chemical.

Other additives may be incorporated into the binder systems according to the various embodiments of the invention to improve their visco-elastic or other properties. Such additives include, but are not limited to, stabilizers/antioxidants (e.g. sterically hindered phenols and/or thioethers, sterically hindered aromatic amines and the like), tackifying resins (e.g. rosin resins, terpene resins, terpene phenolic resins, hydrocarbon resins derived from cracked petroleum distillates, aromatic tackifying resins, tall oil resins, ketone resins and aldehyde resins), plasticizers, such as C1-10 alkyl esters of dibasic acids (e.g., phthalate esters), diaryl ethers, benzoates of polyalkylene glycols, organic phosphates, and alkylsulfonic acid esters of phenol or cresol, fillers (e.g. nanoclays, carbon nanotubes, chalks, talc, calcium carbonate, carbon black, calcium-magnesium carbonates, barite, clay, mica, silicates), and waxes.

For blends in which cross-linking is desired, the binder systems may further comprise a curing agent and optional curing accelerators. Examples of curing agents include, but are not limited to, substances capable of inducing free radical reactions, for example organic peroxides including ketone peroxides, diacyl peroxides, peresters, perketals, hydroperoxides and others such as cumene hydroperoxide, bis(tert-butylperoxy) diisopropyl benzene, di(-2-tert-butyl peroxyisopropyl benzene), 1,1-di-tert-butylperoxy-3,3,5-trimethylcyclohexane, dicumyl peroxide, t-butylperoxybenzoate, di-alkyl peroxydicarbonates, di-peroxyketals (such as 1,1-di-tert-butylperoxy-3,3,5-trimethylcyclohexane), ketone peroxides (e.g., methylethylketone peroxide), and 4,4-di-tert-butylperoxy n-butyl valerate. In addition to peroxides, multifunctional reactive compounds such as isocyanates, epoxies, and maleimides may be used. Examples of accelerators include, but are not limited to, thiazoles and sulfenamides.

The electro-optic medium according to the various embodiments of the present invention may be incorporated into flexible electro-optic displays. An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

Figure 2:
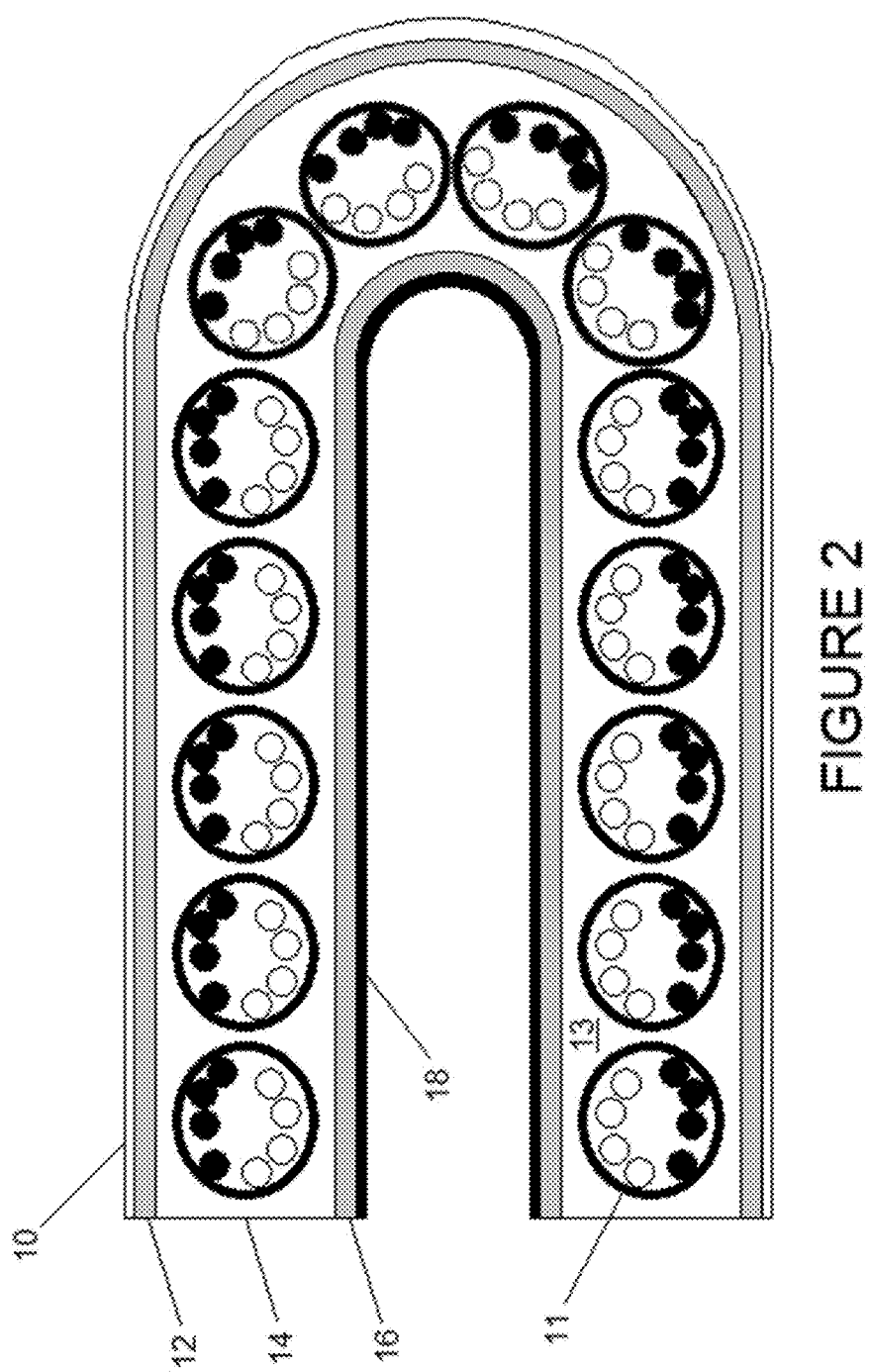
FIG. 2 is a cross-sectional side view of the electro-optic display of FIG. 1 in a folded condition.

Referring now to FIGS. 1 and 2, a flexible display according to one embodiment of the present invention is illustrated. The flexible display may include a light-transmissive protective layer 10 providing a viewing surface. The protective layer 10 is preferably flexible and coated with a first layer of conductive material 12, which is also light-transmissive. A layer of electro-optic medium 14 containing the binder system 13 and encapsulated media 11 is then applied to the conductive material 12. An optional second layer of conductive material 16 may be included between the electro-optic medium 14 and a substrate 18. In some embodiments, the substrate 18 may be a backplane and the second layer of conductive material 16 may include a plurality of conductors. In some embodiments, the substrate 18 and second layer of conductive material 16 may be light-transmissive to provide a dual-sided display. In other embodiments, the substrate 18 may be a release sheet that is removed prior to subsequent lamination procedures. The display illustrated in FIGS. 1 and 2 may also include one or more layers of lamination adhesive (not shown) between any of the two layers within the stack. As demonstrated in FIG. 2, the binder system 13 should be sufficiently energy-dissipating, such that flexing the display will not rupture the encapsulated media 11 present within the bended area of the display, even when bended to a relatively small radii.

The manufacture of an electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

U.S. Patent Application Publication No. 2007/0109219 also describes various methods designed for high volume manufacture of electro-optic displays using inverted front plane laminates; preferred forms of these methods are "multi-up" methods designed to allow lamination of components for a plurality of electro-optic displays at one time.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Electrophoretic media and displays tend to be mechanically robust, as compared with, for example, liquid crystal displays, which require transparent, typically glass, substrates on both sides of the liquid crystal medium. Several of the aforementioned E Ink patents and applications describe processes for producing electrophoretic displays in which an electrophoretic medium is coated on to a flexible plastic substrate provided with an electrically conductive layer, and the resultant electrophoretic medium/substrate sub-assembly is laminated to a backplane containing a matrix of electrodes to form the final display. Furthermore, the aforementioned U.S. Pat. No. 6,825,068 describes a backplane useful in an electrophoretic display and based upon a stainless steel foil coated with a polyimide. Such technologies can produce flexible electrophoretic displays much less susceptible to breakage than glass-based liquid crystal displays.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

All of the contents of the aforementioned patents and applications are incorporated by reference herein in their entireties.

I claim:

1. An electro-optic medium comprising a continuous phase comprising a binder and a discontinuous phase comprising electro-optic material, wherein the binder comprises an elastomer that is a block copolymer and has a Young's modulus less than 25 MPa.

2. The electro-optic medium of claim 1, wherein the electro-optic material comprises a plurality of charged particles dispersed in a suspending fluid and capable of moving therethrough on application of an electric field to the suspending fluid.

3. The electro-optic medium of claim 1, wherein the electro-optic media is encapsulated within capsules.

4. An electro-optic according to claim 1, wherein the block copolymer is a styrene-isobutylene-styrene polymer.

5. An electro-optic medium according to claim 1, wherein the binder comprises a mixture of at least two elastomers.

6. An electro-optic medium according to claim 1, wherein the elastomer has a Young's modulus less than 10 MPa.

7. An electro-optic medium according to claim 1, wherein the binder comprises at least about 20 percent to about 50 percent by weight of the electro-optic medium.

8. A laminate comprising a layer of an electro-optic medium according to claim 1, a light-transmissive substrate, and a light-transmissive electrode disposed between the electro-optic medium and the substrate.

9. A laminate according to claim 8 further comprising a release sheet, wherein the electro-optic medium is disposed between the release sheet and the light-transmissive electrode.

10. An electro-optic medium comprising a continuous phase comprising a binder and a discontinuous phase comprising electro-optic material, wherein the binder comprises an elastomer that is an acrylic polymer and has a Young's modulus less than 25 MPa.

11. The electro-optic medium of claim 10, wherein the electro-optic material comprises a plurality of charged particles dispersed in a suspending fluid and capable of moving therethrough on application of an electric field to the suspending fluid.

12. The electro-optic medium of claim 10, wherein the electro-optic media is encapsulated within capsules.

13. An electro-optic medium according to claim 10, wherein the elastomer has a Young's modulus less than 10 MPa.

14. A laminate comprising a layer of an electro-optic medium according to claim 10, a light-transmissive substrate, and a light-transmissive electrode disposed between the electro-optic medium and the substrate.

15. A laminate according to claim 14 further comprising a release sheet, wherein the electro-optic medium is disposed between the release sheet and the light-transmissive electrode.

16. An electro-optic medium comprising a continuous phase comprising a binder and a discontinuous phase comprising electro-optic material, wherein the binder comprises an ethylene-propylene-diene monomer rubber elastomer selected from the group consisting of ethylene propylene diene terpolymers, ethylene octene copolymers, ethylene butene copolymers, ethylene octene terpolymers, ethylene butene terpolymers, ethylene vinylacetate, and ethylene methylacrylate, and wherein the elastomer has a Young's modulus less than 25 MPa.

17. The electro-optic medium of claim 16, wherein the electro-optic material comprises a plurality of charged particles dispersed in a suspending fluid and capable of moving therethrough on application of an electric field to the suspending fluid.

18. The electro-optic medium of claim 16, wherein the electro-optic media is encapsulated within capsules.

19. An electro-optic medium according to claim 16, wherein the elastomer has a Young's modulus less than 10 MPa.

20. An electro-optic medium comprising a continuous phase comprising a binder and a discontinuous phase comprising electro-optic material, wherein the binder comprises an elastomer having a Young's modulus less than 25 MPa and having a glass transition temperature in a range from −125 to +20° C.

21. The electro-optic medium of claim 20, wherein the electro-optic material comprises a plurality of charged particles dispersed in a suspending fluid and capable of moving therethrough on application of an electric field to the suspending fluid.

22. The electro-optic medium of claim 20, wherein the electro-optic media is encapsulated within capsules.

23. An electro-optic medium according to claim 20, wherein the elastomer has a Young's modulus less than 10 MPa.

24. A laminate comprising a layer of an electro-optic medium according to claim 20, a light-transmissive substrate, and a light-transmissive electrode disposed between the electro-optic medium and the substrate.

25. A laminate according to claim 24 further comprising a release sheet, wherein the electro-optic medium is disposed between the release sheet and the light-transmissive electrode.

26. An electro-optic medium comprising a continuous phase comprising a binder and a discontinuous phase comprising electro-optic material, wherein the binder comprises an elastomer having a Young's modulus less than 25 MPa, and wherein the binder further comprises at least one non-elastomeric polymer selected from the group consisting of polysaccharides, polyvinyl alcohols, N-methylpyrrolidone, N-vinylpyrrolidone, polyethylene glycol, poly(2-hydroxyethyl acrylate), latices of polyurethanes optionally compounded with one or more of acrylics, polyesters, polycarbonates, silicones, an epoxidized vegetable oil fatty acid, an epoxidized ester of a vegetable oil fatty acid, and combinations thereof.

27. The electro-optic medium of claim 26, wherein the electro-optic material comprises a plurality of charged particles dispersed in a suspending fluid and capable of moving therethrough on application of an electric field to the suspending fluid.

28. The electro-optic medium of claim 26, wherein the electro-optic media is encapsulated within capsules.

* * * * *